United States Patent [19]

Suzuki et al.

[11] Patent Number: 4,798,984
[45] Date of Patent: Jan. 17, 1989

[54] ELECTRIC MOTOR WITH EARTH PLATE PRESS FITTED TO MOTOR CASING

[75] Inventors: Satoshi Suzuki; Ryoichi Someya, both of Matsudo, Japan

[73] Assignee: Mabuchi Motor Co., Ltd., Japan

[21] Appl. No.: 87,655

[22] Filed: Aug. 20, 1987

[30] Foreign Application Priority Data

Aug. 20, 1986 [JP] Japan ............................ 61-126928[U]

[51] Int. Cl.⁴ .......................................... H02K 11/00
[52] U.S. Cl. ..................... 310/68 C; 310/42; 310/71; 310/89; 310/90; 310/239
[58] Field of Search ...................... 310/42, 90, 71, 89, 310/40 MM, 239, 66, 68 R, 68 B, 68 C, ; 318/292, 541, 542; 439/92, 108; 174/51; 361/42

[56] References Cited

U.S. PATENT DOCUMENTS

| | | | |
|---|---|---|---|
| 2,911,608 | 11/1959 | Lee | 439/92 |
| 3,159,354 | 12/1964 | Yartz | 310/90 |
| 3,875,462 | 4/1975 | Kiefer | 310/68 C |
| 4,307,508 | 12/1981 | Anderson | 310/71 |
| 4,355,253 | 10/1982 | Vollbrecht | 310/239 |
| 4,426,770 | 1/1984 | Frank | 310/68 R |
| 4,486,058 | 12/1984 | Takagi | 439/92 |
| 4,521,062 | 6/1985 | Kurbikoff | 439/92 |

FOREIGN PATENT DOCUMENTS

| | | | |
|---|---|---|---|
| 0666710 | 7/1963 | Canada | 439/92 |
| 0930276 | 7/1963 | United Kingdom | 439/108 |
| 0764028 | 9/1980 | U.S.S.R. | 439/92 |

Primary Examiner—R. Skudy
Attorney, Agent, or Firm—McGlew & Tuttle

[57] ABSTRACT

A motor comprising a small case having at the center thereof a cylindrical bearing housing for housing a bearing, and at the edges thereof holes through which brush holders receiving and supporting motor terminals connected to brushes extend. A large case forming a motor housing, a earth plate comprising a base having at the central part thereof a contacting and mounting hole into which the bearing housing is inserted and press-fitted, a neck extending from the base flush therewith, an arm extending from the tip of the neck at right angles to the plane of the neck and being inserted into a motor terminal hole on one of the brush holders and a contacting curved portion for making electrical contact with the motor terminal. The earth plate is installed onto the small case by press-fitting the base from the outside to the bearing housing, and press-fitting the arm into the motor terminal hole so as to make electrical contact with the motor terminal. The bearing housing being adapted to be press-fitted to the contacting and mounting hole of the earth plate by providing one or three straight cut portions as necessary on the contacting and mounting hole, or making the contacting and mounting hole of a slightly smaller diameter and providing a plurality of notches or recesses or projections; or by providing a cap, fitted with an air vent hole, on the contacting and mounting hole of the earth plate.

7 Claims, 2 Drawing Sheets

ELECTRIC MOTOR WITH EARTH PLATE PRESS FITTED TO MOTOR CASING

BACKGROUND OF THE INVENTION

This invention relates to motor having at least a permanent magnet as a motor field to which an earth plate is mounted from the outside of the motor casing after the motor body has been assembled therein; the earth plate being fitted to a small casing part by press-fitting the base of the earth plate to the bearing housing formed by the small casing part from and outside and press-fitting the arm thereof into a motor terminal hole to make electrical contact with a motor terminal.

DESCRIPTION OF THE PRIOR ART

There have heretofore been two methods of installing an earth plate in a motor having a permanent magnet; one is to incorporate the earth plate into the inside of a motor casing, the other is to install the earth plate to the outside of casing by spot soldering after the motor body has been assembled.

Of the abovementioned two installation methods, the method of incorporating the earth plate inside the casing involves selection of a predetermined earth plate at the stage of assembly of the motor body before a small casing part is engaged with a large casing part. To achieve this, a separate process for selecting the earth plate has to be provided when automating the manufacturing process of motors.

The method of installing the earth plate to the outside of the casing by spot soldering, though free from the aforementioned problem, involves troublesome spot soldering operations.

SUMMARY OF THE INVENTION

This invention is intended to overcome these problems.

It is the first object of this invention to provide a motor having such a construction that an earth plate is installed to the outside of a casing, after the motor body has been assembled; the earth plate being installed to the casing by relatively simple press-fitting operations, taking advantage of the fact that a cylindrical bearing housing protrudes outwards from the casing, and the fact that motor terminals are led out through motor terminal holes.

It is the second object of this invention to provide a motor having such a construction that the earth plate comprises a base having at the central part thereof a contacting and mounting hole or aperture into which the bearing housing is inserted and press-fitted, a neck extending from the base flush therewith, an arm extending from the tip of the neck at right angles to the plane of the neck and being inserted into a motor terminal hole on one of the brush holders, and a contacting curved portion or upset for making electrical contact with the motor terminal.

It is the third object of this invention to provide a motor having such a construction that the earth plate is installed on the small casing part by press-fitting the base of the earth plate to the bearing housing from the outside and press-fitting the arm of the earth plate to the motor terminal hole to make electrical contact with the motor terminal.

It is the fourth object of this invention to provide a motor having such a construction that the bearing housing is adapted to be press-fitted by providing one or three straight cut portions as necessary on the contacting and mounting hole of the earth plate or a plurality of notches or recesses or projections, or by providing a cap, fitted with an air vent hole, on the contacting and mounting hole of the earth plate.

DETAILED DESCRIPTION OF THE EMBODIMENT

In FIGS. 1 through 5E, numeral 1 refers to a large case; 2 to a small casing part; 3 to an earth plate; 4 to a motor terminal; 5 to a brush holder; 6 to a cylindrical bearing housing; 7 to a shaft; 3-1 to a base, 3-2 to a contacting and mounting or aperture hole; 3-3 to a neck; 3-4 to an arm; and 3-5 to an upset contacting curved portion, respectively.

The electric motor according to this invention is manufactured by first assembling the motor body without incorporating an earth plate inside the housing, then assembling a small casing part 2 and installing from the outside an earth plate 3 as necessary. The contacting curved portion 3-5 of the earth plate 3 is interposed between any one of the motor terminals 4 and the small casing part 2 to electrically connect both. This invention is concerned with a motor characterized in the construction and mounting method of the earth plate 3, and the motor body has the same construction as the conventional type of electric motor.

Figure 3:
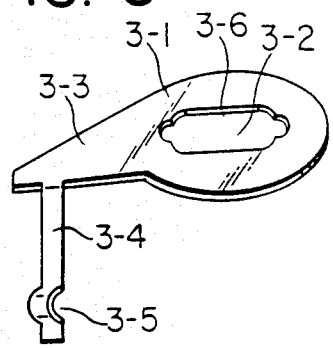
FIG. 3 shows an earth plate used in this invention.

In the following, therefore, the construction of the earth plate 3 will be described. The construction of the earth plate 3 shown in FIG. 3 is as follows. The base 3-1 of the earth plate 3 is of a substantially circular shape, for example, and has a contacting and mounting or aperture hole 3-2 at the center thereof. The contacting and mounting hole 3-2 has a straight cut portion 3-6 along the edge thereof. The straight cut portion 3-6 serves as mechanically and electrically connecting means to the small casing part 2. The neck 3-3 of the earth plate 3 is extended from the base 3-1 flush with the base 3-1 in a substantially triangular shape. Near the free end or tip of the neck 3-3 provided is the arm 3-4 of the earth plate 3 which extends at right angles to the plane of the neck 3-3. At the tip of the arm 3-4 provided is the contacting curved portion 3-5.

Figure 1:
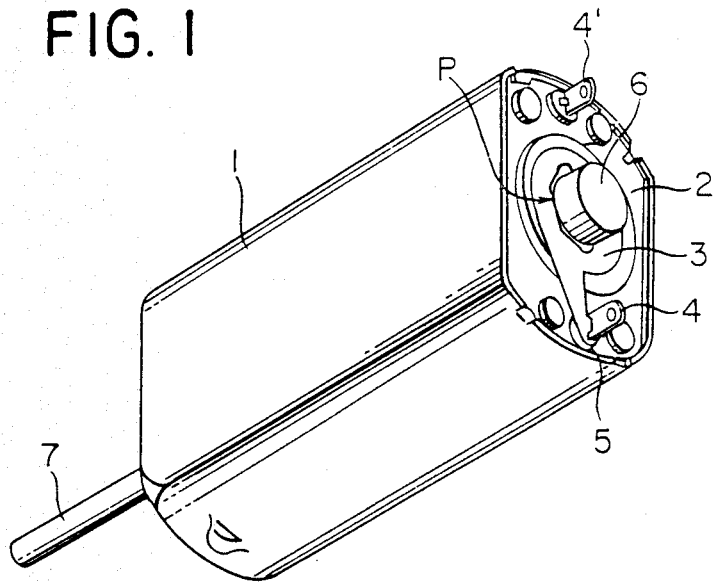
FIG. 1 is a perspective view of a motor embodying this invention.
Figure 2:
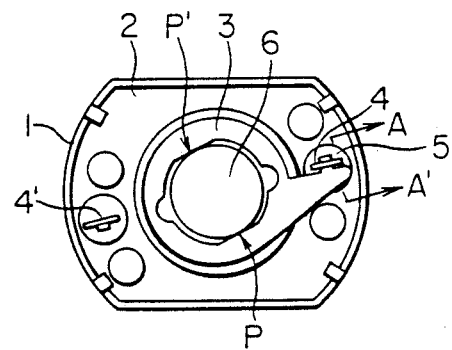
FIG. 2 is a side elevation of a motor embodying this invention.

Next, the mounting method of the earth plate 3 will be described, referring to FIG. 1. The earth plate 3 is installed taking advantage of the fact that an outwardly protruding cylindrical portion, called the bearing housing 6, always exists on the small casing part 2, and the fact that motor terminals are led out through motor terminal holes. First, the tip of the arm 3-4 is inserted into the motor terminal hole of the brush holder 5 into which the motor terminal 4 that is to be earthed, is inserted. When the arm 3-4 is press-fitted until the base 3-1 approaches the bearing housing 6, which is part of the small casing part 2, the earth plate 3 is positioned so that the top of the bearing housing 6 fits the contacting and mounting hole 3-2. And then, the arm 3-4 is press-fitted, and the base 3-1 is press-fitted until the base 3-1 reaches the root of the bearing housing 6. By forming the straight cut portion of the contacting and mounting hole 3-2 into such a size as to tightly grip the circumferential surface of the bearing housing 6 when the base 3-1 is press-fitted to the bearing housing 6, the earth plate 3 is mechanically tightly fitted to the bearing housing 6 by the contact force at the contact points (P in FIG. 1, and P and P' in FIG. 2). At the same time, the earth plate 3 is electrically connected to the bearing housing 6 at the contact points P and P'. A positive electrical connection can be achieved because the action of abrasion associated with press-fitting operation thoroughly removes dirt and rust from the contact surface. This means that the earth plate 3 is securely connected both mechanically and electrically to the small casing part 2 since the bearing housing 6 is part of the small casing part 2.

As described above, this invention is characterized in that the earth plate 3 is installed on the small casing part 2 by such a simple operation as press-fitting, taking advantage of the presence of an outwardly protruding cylindrical portion, that is, the bearing housing, on the small casing part 2.

Figure 4:
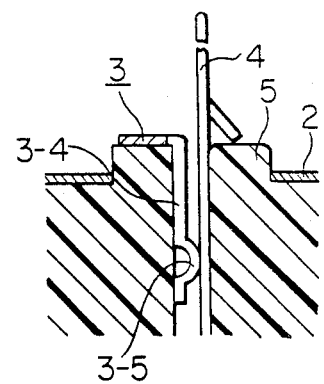
FIG. 4 is a fragmentary sectional view taken along the line A-A' in FIG. 2.

Next, the method of electrically connecting the earth plate 3 to the motor terminal will be described. FIG. 4 is a cross-sectional view taken along the line A–A' in FIG. 2. The contacting curved portion 3-5 at the tip of the arm 3-4 press-fitted into the hole of the brush holder 5 is forced onto the motor terminal 4, whereby being electrically connected to the motor terminal 4.

Thus, the motor terminal 4 is connected to the motor case by means of the earth plate 3.

Although the earth plate 3 shown in FIG. 3 has two straight cut edge portions defining the contacting and mounting hole or aperture 3-2 thereof, those straight cut portions are shown as an example of the means for ensuring mechanical contact when the earth plate 3 is press-fitted to the bearing housing 6, and the number of straight cut portions need not be two. One or three straight cut portions may be provided to meet the required mechanical contact force. The contacting and mounting hole 3-2 need not be of a shape having straight cut portions, but may be of any shape that can secure mechanical contact during press-fitting. FIGS. 5A through 5E show other examples of the earth plate.

Figure 5A:
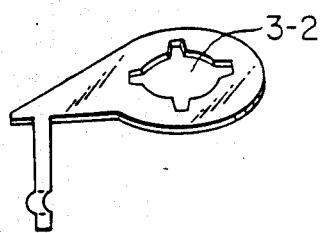
FIGS. 5A through 5E show other examples of the earth plate used in this invention.
Figure 5B:
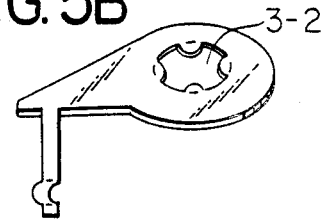
Figure 5C:
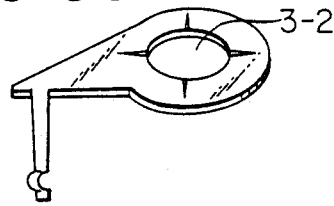
Figure 5D:
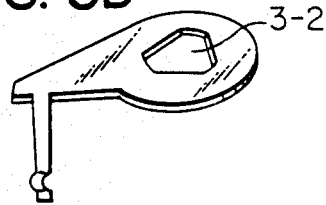
Figure 5E:
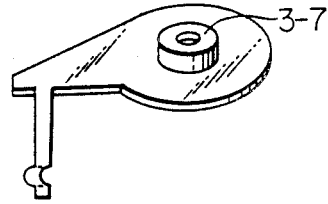

FIG. 5A shows an example where a plurality (4 in the figure) of recesses are provided on the contacting and mounting hole or aperture 3-2 of the earth plate 3 so as to press-fit the bearing housing 6, FIG. 5B shows an example where a plurality (4 in the figure) of projections are provided on the contacting and mounting hole or aperture 3-2 so as to press-fit the bearing housing 6, FIG. 5C shows an example where the recesses in FIG. 5A are replaced with notches, FIG. 5D shows an example where three straight cut portions are provided, and FIG. 5E shows an example where a cap 3-7 having an air vent hole is provided, to which the bearing housing 6 is press-fitted.

As described above, this invention makes it possible to install an earth plate from the outside of a motor, instead of incorporating it inside the motor casing. Consequently, the process of assembling the earth plate can be eliminated from the entire motor manufacturing process ranging from assembling parts and covering the small casing part to the assembly of a motor body. Thus, the motor body can be manufactured on a standardized manufacturing line, independently of the type of earth plate. And, if needed, the earth plate can be installed on the finished motor before shipment.

In addition, this invention adopts a simple method of installing the earth plate on the motor casing by press-fitting operation, taking advantage of the fact that an outwardly protruding cylindrical portion, that is, the bearing housing, exists on the motor casing, thus substantially simplifying the earth plate installation operation, compared with the conventional spot soldering operation.

What is claimed is :

1. An electric motor having a motor housing comprising a large casing part with an open end supporting a small casing part, the small casing part having at the center thereof a cylindrical bearing housing protruding outwardly of the motor housing and having at the edges thereof holes through which brush holders formed with holes receiving and supporting motor terminals extend, and an earth plate comprising a base having at a central part thereof a contacting and mounting hole into which the external surface of said bearing housing is inserted as a press-fit, a neck extending from said base flush therewith, an arm extending from a free end of said neck at right angles to the plane of said neck and being inserted into at least one of the motor terminals receiving holes on one of said brush holders, and a contacting curved portion making electrical contact with at least one of said motor terminals; said earth plate being installed on said small casing part by press-fitting said base from the outside on said bearing housing and press-fitting said arm into said motor terminal receiving hole so as to make electrical contact with said motor terminal.

2. An electric motor as claimed in claim 1 wherein at least one straight cut edge portion defines said contacting and mounting hole of said earth plate so as to allow said bearing housing to be press-fitted to said contacting and mounting hole.

3. An electric motor as claimed in claim 1 wherein a plurality of recesses are provided on edge portions defining said contacting and mounting hole of said earth plate so as to allow said bearing housing to be press-fitted to said contacting and mounting hole.

4. An electric motor as claimed in claim 1 wherein a plurality of notches are provided on edge portions defining said contacting and mounting hole of said earth plate so as to allow said bearing housing to be press-fitted to said contacting and mounting hole.

5. An electric motor as claimed in claim 1 wherein a plurality of projections are provided on edge portions defining said contacting and mounting hole of said earth plate so as to allow said bearing housing to be press-fitted to said contacting and mounting hole.

6. An eletric motor as claimed in claim 1 wherein a cap having an air vent hole is provided on edge portions defining said contacting and mounting hole of said earth plate so as to allow said bearing housing to be press-fitted to said contacting and mounting hole.

7. An electric motor including a housing comprising a first casing part having an opening at one end and a second casing part assembled with the first casing part at the one end thereof closing the opening, the second casing part defining a centrally located, cylindrical bearing housing portion of conductive material which protrudes outwardly of the housing and being formed with an opening spaced apart from the bearing housing portion; an insulating brush terminal holder in the housing at the one end and formed with a brush terminal receiving passageway aligned with the opening in the second casing part; a brush motor terminal extending along the passageway; and, an earth plate formed as one-piece comprising an apertured base from which extends a neck in co-planar relation therewith and an arm extending from the free end of the neck transversely of its plane and formed with an upset contacting portion, the earth plate being mounted on the housing by the aperture receiving the cylindrical bearing housing portion as a press-fit with edges defining the aperture abrading the cylindrical bearing housing portion and the neck being simultaneously force-fitted into the brush terminal receiving passageway with the upset contact portion effecting electrical connection to the brush terminal, whereby the earth plate establishes a permanent electrical connection between the bearing housing portion and the brush terminal after assembly of the first and second casing parts.

* * * * *